3,763,194
BIOLOGICALLY ACTIVE 17α-ETHYNYL-16,17-DI-
HYDROXY-13-ALKYLGONA-1,3,5(10)-TRIENES
Reinhardt P. Stein, Audubon, Pa., assignor to American
Home Products Corporation, New York, N.Y.
No Drawing. Filed July 21, 1972, Ser. No. 274,011
Int. Cl. C07c 169/08
U.S. Cl. 260—397.5    2 Claims

ABSTRACT OF THE DISCLOSURE

13 - alkylgona-1,3,5(10),16-tetraene-3,17-diol, diacetate is converted by treatment with lead acetate to the corresponding 16-acetate-17-one compound which on treatment with ethynyl Grignard affords 13-alkyl-17α-ethynylgona 1,3,5(10)-triene-3,16β,17β-triol. Treatment of the tetraene starting material with organic peracid followed by boron trifluoride-etherate cleavage and treatment with ethynyl Grignard affords the corresponding 3,16α,17β-triol. The triol compounds of the invention exert antilipemic effects in warm blooded animals.

DESCRIPTION OF THE INVENTION

The invention sought to be patented in its composition aspect resides in the concept of a compound of the structure

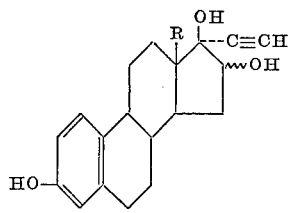

wherein R is alkyl of from 1 to 4 carbon atoms. The symbol ~ indicates that the configuration at carbon atom 16 is either α or β; both are included in the invention.

The tangible embodiments of the composition aspect of the invention possess the inherent applied use characteristic of exerting an anti-lipemic effect in warm-blooded animals as evidenced in standard biological test procedures.

The invention sought to be patented in its process aspect resides in the concept of a process for the preparation of a 17α - ethynyl - 13-alkylgona-16β,17β-diol steroid which comprises protecting the 16-hydroxy function of a 13-alkyl - 16α-hydroxygon-17-one steroid, treating the thus protected steroid with lithium acetylide-ethylene diamine complex in dimethyl sulfoxide/benzene, and removing the protecting group.

DESCRIPTION OF THE PREFERRED EMBODIMENTS

Although, for convenience, the following discussion will describe the preparation of the composition aspect of the invention, as well as the practice of the process aspect, by reference to a particular embodiment thereof wherein R is ethyl, it is to be understood that this discussion is equally applicable to all of the embodiments of the invention.

Referring to the following flow chart wherein the compounds are assigned Roman numerals for purposes of identification, the starting material, 13-ethylgona-1,3, 5(10),16-tetraene-3,17-diol, diacetate (I) may be prepared by means known in the art (British Pat. No. 1,115, 954). Treatment of I with lead tetraacetate affords 13-ethyl - 3,16β-dihydroxygona-1,3,5(10)-trien-17-one diacetate (II). Treatment of II with an ethynyl Grignard reagent, such as ethynyl magnesium bromide affords the product, 13-ethyl-17α-ethynylgona-1,3,5(10)-triene-3,16β,17β-triol (III).

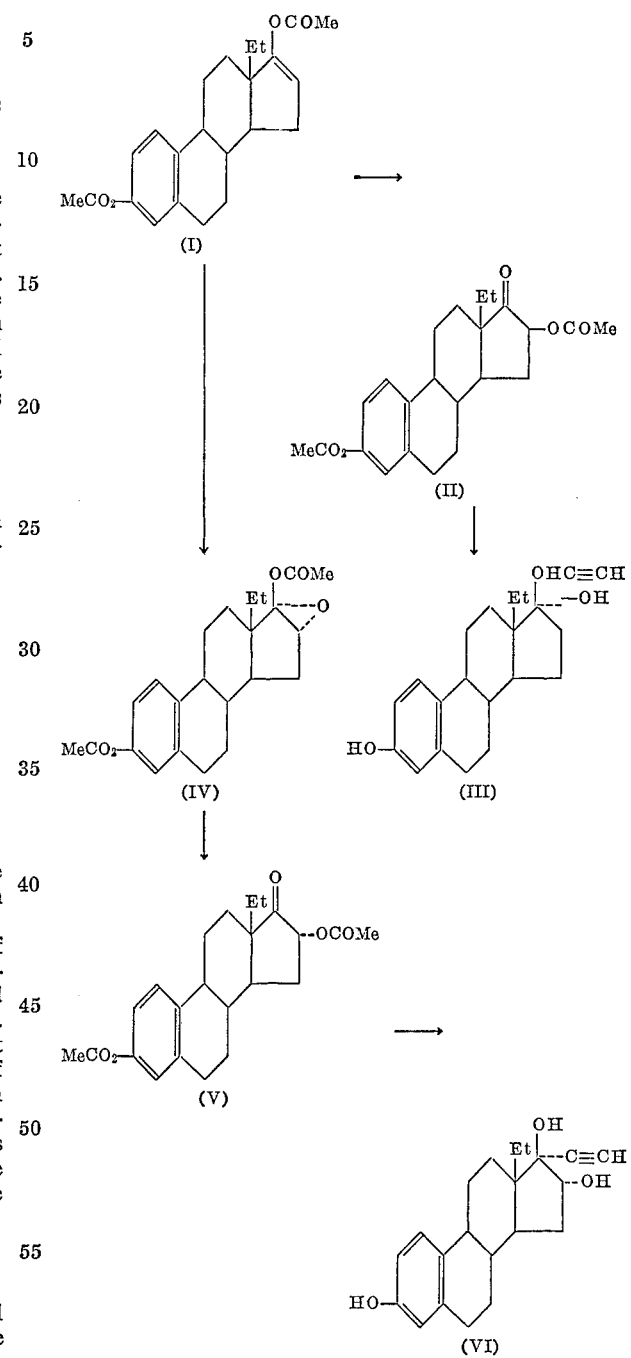

To prepare the 16α-epimer of III, I is first treated with an organic peracid, such as m-chloro-perbonzoic acid to afford the corresponding 16,17-epoxide (IV). Boron trifluoride-etherate cleavage of IV yields 13-ethyl-3,16α-dihydroxygona-1,3,5(10)-trien-17-one diacetate (V) which on treatment with an ethynyl Grignard reagent such as ethynyl magnesium bromide affords the desired product, 13-ethyl-17-ethynylgona-1,3,5(10)-triene-3,16α,17β-triol (VI).

In an alternate synthesis of the compounds of the invention, as depicted in the following flow chart, the starting material, 3,16α - dihydroxy - 13-ethylgona-1,3,5(10)-trien-17-one (VII), which may be prepared by means known in the art (British Pat. No. 1,115,954; U.S. Pat. 3,647,784), is treated with a reagent capable of forming a protecting group at the C-16 position, for example with dihydropyran in benzene containing acetyl chloride, pyridine, and ethanol to form the corresponding bis-tetrahydro-pyranyl ether (VIII). Treatment of VIII with an ethynyl Grignard reagent such as ethynyl magnesium bromide in a solvent such as tetrahydrofuran affords, after acidic hydrolysis of the intermediate the 16α-hydroxy compound of the invention (VI). Upon treatment of VIII with lithium acetylide-ethylene diamine complex in dimethyl-sulfoxide/benzene followed by acidic hydrolysis, there is obtained the 16β-hydroxy compound of the invention (III).

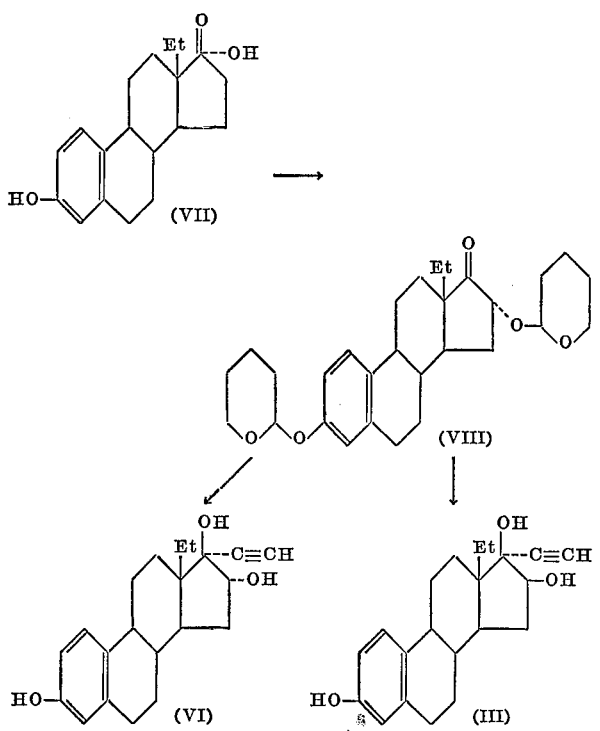

In the foregoing discussion, the conversion of VIII to III was described with reference to the synthesis of compounds of the invention. However, this process is not so limited, and in fact is applicable to the conversion of any 16α-hydroxy-17-one steroid to a 16β,17β-dihydroxy-17α-ethynyl steroid. In this discussion, the 16-hydroxy function was protected as a tetrahydropyranyl moiety, but the invention is not so limited. Any of the various protecting groups which are known in the art which are stable under the basic conditions of the reaction and readily removable thereafter may be used.

In employing the compounds of the invention to produce an antilipemic effect, the amount of compound to be administered will vary depending on such factors as the particular compound employed, the route of administration, the particular animal in which it is employed, and the degree of antilipemic response desired. Preferably the dosage will be individualized. The compounds of this invention are effective upon both oral and parenteral administration. It has been found that in hypercholesterolemic rats, a reduction of approximately 50% in the serum cholesterol level can be obtained upon oral administration at approximately 1 mg. per kg. body weight of either 13-ethyl-17α-ethynylgona-1,3,5(10)-triene-3,16β,17β-triol or 13 - ethyl - 17α-ethynylgonal-1,3,5(10)-triene-3,16α,17β-triol, daily, for three consecutive days.

The following examples further illustrate the best mode contemplated by the inventors of carrying out their invention:

EXAMPLE 1 dl-13-ethyl-3,16β-dihydroxygona-1,3,5(10)-trien-17-one, diacetate

Dissolve dl - 13-ethylgona-1,3,5(10),16-tetraene-3,17-diol, diacetate (4.0 g.) in glacial acetic acid (80 ml.) and acetic anhydride (4 ml.) then add lead tetraacetate (5.5 g. of material which is 10% wet with acetic acid). Stir the reaction at room temperature for 20 hours. Remove the solvents in vacuo then digest the resulting solids with water and benzene. Extract with benzene-ether then wash with water, saturated sodium bicarbonate solution, water, brine and dry over anhydrous sodium sulfate. Filter and evaporate the extract in vacuo. Dissolve the resulting oil in ether-methylene chloride, treat with activated charcoal, filter and evaporate in vacuo. Crystallize from isopropanol to get 2.34 g., M.P. 174–177°. Repeat the treatment with charcoal and crystallization to get 0.80 g. of product, M.P. 179–181°. Repeat the purification again, and crystallize from methanol to get 0.53 g. of pure title product, M.P. 182–183°;

$\lambda_{max.}^{KBr}$ 5.76

Analysis (percent): 72.16; H, 7.47. Calcd. for $C_{23}H_{28}O_5$ (percent): C. 71.85; H, 7.34.

EXAMPLE 2 dl-13-ethyl-17α-ethynylgona-1,3,5(10)-triene-3,16β,17β-triol

Equip a flask with a magnetic stirrer, condenser and gas inlet tube then charge the flask with dry tetrahydrofuran (350 ml.) and 3 M ethereal methyl magnesium bromide (120 ml.). Bubble purified acetylene through the stirred solution for 2.5 hours then added dl-13-ethyl-3,16β-dihydroxygona-1,3,5(10)-trien-17-one, diacetate (3.70 g.). Reflux gently with stirring under acetylene for 3 hours, then let stand overnight at room temperature. Pour the reaction into 20% ammonium chloride solution and extract with ethyl acetate-ether. Wash, dry and evaporate the extract in vacuo. Dissolve the oil in tetrahydrofuran, treat with activated charcoal, filter and evaporate the solvent in vacuo. Crystallize from ether to get 2.66 g. of the title product, M.P. 197–203°. Obtain an analytical sample from ethyl acetate, as a solvate of ethyl acetate, M.P. 204–207°.

$\lambda_{max.}^{KBr}$ 2.97–3.14 and 5.75 (ethyl acetate) μ.

Analysis (percent): C, 74.14; H, 8.50. Calcd. for $C_{21}H_{26}O_3 \cdot 0.6\ C_4H_8O_2$ (percent): C, 74.10; H, 8.19.

EXAMPLE 3 dl-13-ethyl-3,16α-dihydroxygona-1,3,5(10)-trien-17-one, diacetate

Dissolve dl - 13-ethylgona-1,3,5(10),16-tetraene-3,17-diol, diacetate (2.50 g.) in benzene (60 ml.), stir at room temperature then add a solution of m-chloroperbenzoic acid (1.60 g. of 85% assay) in benzene (60 ml.) dropwise over 0.5 hour. Stir a further 1.5 hours then quench the reaction with a solution of sodium sulfite (1.60 g.) in water (25 ml.). Wash the benzene layer with saturated sodium bicarbonate solution, water, brine and dry over anhydrous sodium sulfate. Filter and reduce the volume to about 100 ml. by evaporation of the benzene in vacuo. To this solution which contains dl-13-ethyl-16α,17α-epoxygona-1,3,5(10)-triene-3,17β-diol, diacetate add 47% boron trifluoride-etherate (3 ml.) dropwise over 2 minutes then stir at room temperature for 0.75 hour. Add water and extract with ether. Wash the extract with water, saturated sodium bicarbonate solution, water, brine and dry over anhydrous sodium sulfate. Filter and remove the solvent in vacuo. Dissolve the residue in methylene chloride, treat with activated charcoal filter then evaporate to low volume in vacuo. Replace the solvent with isopropanol by boiling, let stand then filter to get 2.26 g. of the title product, M.P. 166–170°.

$\lambda_{max.}^{KBr}$ 5.65 to 5.75μ

EXAMPLE 4 dl-13-ethyl-17α-ethynylgona-1,3,5(10)-triene-3,16α,17β-triol

Equip a flask with magnetic stirrer, condenser and gas inlet tube then charge with dry tetrahydrofuran (130 ml.) and 3 M ethereal methyl magnesium bromide (60 ml.). Pass purified acetylene gas through the stirred solution for 2.5 hours then add dl-13-ethyl-3,16α-dihydroxygona-1,3,5 (10)-trien-17-one, diacetate (2.00 g.) and stir with gentle refluxing under acetylene for 2 hours. Add 50 ml. more of tetrahydrofuran, reflux 1 hour more then cool and let stand overnight. Pour the reaction into 20% ammonium chloride solution and extract with ethyl acetate-ether. Wash, dry and evaporate the extract in vacuo. Treat the resulting oil in tetrahydrofuran with activated charcoal, filter and evaporate the solvent in vacuo. Crystalline the resulting oil from ether and filter to obtain 1.32 g., M.P. 223–225°. Retreat the sample with charcoal as above and crystallize from isopropanol-benzene to obtain 1.00 g., M.P. 239–242°. Purify again, crystallizing from isopropanol to obtain 0.68 g. of pure title product, M.P. 241–244°.

$\lambda_{max.}^{KBr}$ 3.0 to 3.2μ

Analysis (percent): C, 76.98; H, 8.17. Calcd. for $C_{21}H_{26}O_3$ (percent): C, 77.27; H, 8.03.

EXAMPLE 5 dl-13-ethyl-3,16α-bis(tetrahydropyran-2-yloxy)gona-1,3,5(10)-trien-17-one

Stir a mixture of dl-13-ethyl-3,16α-dihydroxygona-1,3,5 (10)-trien-17-one (1.20 g.) and distilled dihydropyran (25 ml.), cool with an ice-methanol bath then add phosphorus oxychloride (15 drops). Stir, remove the ice-bath then continue stirring at room temperature for 18 hours. Add solid sodium methoxide (1.00 g.), stir then add water. Extract with ether then wash, dry and evaporate the extract in vacuo. Dissolve the resulting oil in cyclohexane and pass the solution through a short column of fuller's earth. Wash the column with cyclohexane then evaporate in vacuo. Crystallize from cold methanol to obtain 0.27 g. of the title product, M.P. 140–142°.

$\lambda_{max.}^{KBr}$ 5.73μ

EXAMPLE 6 dl-13-ethyl-3,16α-bis(tetrahydropyran-2-yloxy)gona-1,3,5(10)-trien-17-one

Combine dl - 13-ethyl-3,16α-dihydroxygona-1,3,5(10)-trien-17-one (1.78 g.), benzene (10 ml.), absolute ethanol (0.2 ml.), pyridine (0.3 ml.), acetyl chloride (0.25 ml.) and distilled dihydropyran (5 ml.) and let the mixture stand at room temperature for 6 days with occasional swirling. Pour the reaction into saturated sodium bicarbonate solution and extract with ether. Wash, dry and evaporate the extract in vacuo. Dissolve the resulting oil in benzene and pass the solution through a short column of fuller's earth. Wash the column with benzene and evaporate in vacuo. Crystallize the resulting oil from methanol to obtain 2.29 g. of the title product, M.P. 141–143°.

$\lambda_{max.}^{KBr}$ 5.73μ

Analysis (percent): C, 74.69; H, 8.88. Calcd. for $C_{29}H_{40}O_5$ (percent): C, 74.32; H, 8.60.

EXAMPLE 7 dl-13-ethyl-17α-ethynylgona-1,3,5(10)-triene-3,16α,17β-triol

Equip a flask with magnetic stirrer, condenser and gas inlet tube and charge with dry tetrahydrofuran (300 ml.). Add 3 M ethereal methyl magnesium bromide (90 ml.) then bubble purified acetylene through the stirred solution for 2.5 hours. Add dl-13-ethyl-3,16α-bis(tetrahydropyran-2-yloxy)gona-1,3,5(10)-trien-17-one (3.00 g.) and reflux gently with stirring under acetylene for 3 hours. Cool and let stand overnight. Pour the reaction into 20% ammonium chloride solution and extract well with ether. Wash, dry and evaporate the extract in vacuo. Treat the residue in ether with activated charcoal, filter and evaporate in vacuo. Dissolve the resulting material in methanol (30 ml.), add conc. hydrochloric acid (15 drops) then warm gently for 5 minutes. Let cool for 1 hour, dilute with water and filter the resulting precipitate onto filter-aid. Dry the mixture ($P_2O_5$/vac.) then extract with tetrahydrofuran. Filter and treat the filtrate with activated charcoal. Filter and evaporate in vacuo and crystallize the residue from isopropanol. Filter, wash the solid with ether and dry to get 1.46 g., M.P. 237–239°. Further purify the product by treatment with activated charcoal in tetrahydrofuran-methanol. Filter and evaporate the solvents in vacuo and crystallize from isopropanol to get 1.24 g. of title product, M.P. 240–241°.

$\lambda_{max.}^{KBr}$ 3.1μ

Analysis (percent): C, 77.14; H, 8.07. Calcd. for $C_{21}H_{26}O_3$ (percent): C, 77.27; H, 8.03.

EXAMPLE 8 dl-13-ethyl-17α-ethynylgona-1,3,5(10)-triene-3,16β,17β-triol

Dissolve dl - 13 - ethyl-3,16α-bis(tetrahydropyran-2-yloxy)gona-1,3,5(10)-trien-17-one (200 mg.) in dry benzene (5 ml.), dilute with dry DMSO (15 ml.) then bubble purified acetylene through the stirred solution for 1 hour. Add lithium acetylide-ethylene diamine complex (200 mg.) and continue stirring under acetylene for 1.5 hours. Add another 200 mg. of the reagent complex, stir for 1 hour more then pour the reaction into ice-water. Extract well with ether then wash, dry and evaporate the extract in vacuo. Dissolve the residue in methanol (10 ml.), add conc. hydrochloric acid (3 drops) swirl and let stand for 1 hour at room temperature. Add water (50 ml.) and extract with ether. Wash, dry and evaporate the extract in vacuo. Treat the resulting oil in tetrahydrofuran with activated charcoal, filter and evaporate in vacuo. Crystallize the resulting oil from ether to get 80 mg. of the title product, M.P. 204–206°.

$\lambda_{max.}^{KBr}$ 2.95 and 3.05μ

EXAMPLE 9 dl-13-ethyl-17α-ethynyl-16β,17β-dihydroxygon-4-en-3-one

Dissolve dl-13-ethyl-3-methoxy-16α-(tetrahydropyran-2-yloxy)gona-2,5(10)-dien-17-one in dry benzene (40 ml.), dilute with dry DMSO (120 ml.) then bubble purified acetylene through the stirring solution for 1.5 hours. Add lithium acetylide-ethylene diamine complex (3.5 g.), stir for 2 hours then add another 3.5 g. of the reagent complex and continue stirring for 1 hour. Pour the reaction into ice water, extract with ethyl acetate-ether. Then wash, dry and evaporate the extract in vacuo. Treat the residue in tetrahydrofuran with activated charcoal, filter and remove the solvent in vacuo. Cover the residue with methanol (50 ml.) add a solution of methanol (200 ml.)-conc. hydrochloric acid (30 ml.) and water (30 ml.). Gently warm the mixture on the steam bath for 5 minutes then stir at room temperature for 1 hour. Warm the reaction again for 5 minutes, stir 0.5 hour at room temperature then add water (500 ml.). Add solid sodium chloride (100 g.) and extract with ether-ethyl acetate. Wash, dry and evaporate the extract in vacuo. Dissolve the resulting oil in ether, treat with activated charcoal quickly, filter and evaporate the ether in vacuo. Crystallize the resulting oil by scratching in ether to obtain 2.20 g. of title product, M.P. 171–173°. Further purify the solid by treatment with charcoal as above in tetrahydrofuran followed by crystallization from ether to get 1.80 g. of the pure title product, M.P. 175–177°.

$\lambda_{max.}^{KBr}$ 2.95 to 3.07, 6.02 and 6.21$\mu$. $\lambda_{max.}^{EtOH}$ 238.5 m$\mu$ ($\epsilon$ 17,100)

Analysis (percent): C, 76.93; H, 8.98. Calcd. for: $C_{21}H_{28}O_3$ (percent): C, 76.79; H, 8.59.

EXAMPLE 10 dl-3,3-ethylenedioxy-16$\beta$-(tetrahydropyran-2-yloxy)-13-ethyl-17$\alpha$-ethynyl-5$\beta$-gon-17$\beta$-ol Equip a flask with a condenser, a magnetic stirrer and a gas inlet tube. Dissolve the dl-3,3-ethylenedioxy-16$\alpha$-(tetrahydropyran-2-yloxy)-13-ethyl-5$\beta$-gon-17-one (400 mg.) in dry benzene (4.0 ml.), dilute the solution with dry dimethyl sulfoxide (10 ml.), pass purified acetylene gas into the solution and stir for one hour. Add lithium acetylide ethylenediamine complex (0.5 g.) and stir for 1.5 hours. Then add another 1.5 g. of complex and stir for 1 hour. Pour the mixture into ice water. Extract with ethyl acetate, wash, dry and evaporate the extract in vacuo to obtain the title product.

For the above substrate substitute dl-3,3-ethylenedioxy-16$\alpha$-(tetrahydropyran-2-yloxy)-13-ethyl-5$\alpha$-gon-17-one to obtain dl - 3,3 - ethylenedioxy-16$\beta$-(tetrahydropyran-2-yloxy)-13-ethyl-17$\alpha$-ethynyl-5$\alpha$-gon-17$\beta$-ol.

EXAMPLE 11 dl-16$\beta$,17$\beta$-dihydroxy-13-ethyl-17$\alpha$-ethynyl-5$\beta$-gon-3-one

Add dl - 3,3 - ethylenedioxy-16$\beta$-(tetrahydropyran-2-yloxy)-13-ethyl-17$\alpha$-ethynyl-5$\beta$-gon-17$\beta$-ol (300 mg.) to 10 ml. of a solution of concentrated hydrochloric acid (3.2 ml.) in methanol (100 ml.) and stir for two hours. Add water and extract with ethyl acetate. Wash, dry and evaporate the extract in vacuo to obtain the title compound.

For the above substrate substitute dl-3,3-ethylenedioxy-16$\beta$ - (tetrahydropyran-2-yloxy)-13-ethyl-17$\alpha$-ethynyl-5$\alpha$-gon-17$\beta$-ol to obtain dl-16$\beta$,17$\beta$-dihydroxy-13-ethyl-17$\alpha$-ethynyl-5$\alpha$-gon-3-one.

I claim:
1. The process for the preparation of a 17$\alpha$-ethynyl-13-alkylgona-16$\beta$,17$\beta$-diol steroid which comprises protecting the 16-hydroxy function of a 13-alkyl-16$\alpha$-hydroxy-gon-17-one steroid, treating the thus protected steroid with lithium acetylide-ethylene diamine complex in dimethyl sulfoxide/benzene, and removing the protecting group.
2. The process according to claim 1 wherein 13-ethyl-17$\alpha$-ethynylgona-1,3,5(10)-triene-3,16$\beta$,17$\beta$-triol is prepared by treating 13-ethyl-3,16$\alpha$-dihydroxygona-1,3,5(10)-trien-17-one with dihydropyran in the presence of an acyl halide and a weak organic base, and treating the thus-obtained compound with lithium acetylide-ethylene diamine complex in dimethyl sulfoxide/benzene followed by acid hydrolysis.

References Cited
UNITED STATES PATENTS

| | | | |
|---|---|---|---|
| 3,336,347 | 8/1967 | Engelfried et al. | 260—397.5 |
| 3,520,882 | 7/1970 | Cross et al. | 260—239.55 |

HENRY A. FRENCH, Primary Examiner

U.S. Cl. X.R.

260—239.55 R, 397.4, 999